Aug. 12, 1969   R. G. STURGEON   3,460,552
CONTACT LENS CASE

Filed June 20, 1967   3 Sheets-Sheet 1

INVENTOR.
ROBERT G. STURGEON
BY
ATTORNEYS

Aug. 12, 1969    R. G. STURGEON    3,460,552
CONTACT LENS CASE

Filed June 20, 1967    3 Sheets-Sheet 2

INVENTOR.
ROBERT G. STURGEON
BY
*Erhoff and Ali Jr*
ATTORNEYS

Aug. 12, 1969  R. G. STURGEON  3,460,552
CONTACT LENS CASE

Filed June 20, 1967  3 Sheets-Sheet 3

INVENTOR.
ROBERT G. STURGEON
BY
ATTORNEYS

United States Patent Office 3,460,552
Patented Aug. 12, 1969

3,460,552
CONTACT LENS CASE
Robert G. Sturgeon, Sunnyvale, Calif., assignor to Barnes-Hind International, Inc., a corporation of California
Filed June 20, 1967, Ser. No. 647,561
Int. Cl. B08b 3/04, 3/00
U.S. Cl. 134—135                                           1 Claim

ABSTRACT OF THE DISCLOSURE

Liquid containing, flat contact lens case wherein the lenses are individually carried on a platform which rises out of the liquid as the case is opened and is lowered into the liquid when the case is closed.

BACKGROUND OF THE INVENTION

*Field of the invention.*—Contact lens case.

*Description of the prior art.*—Liquid containing contact lens cases have previously been known but they have ordinarily not been heat sterilizable nor have they been adequately leakproof. Many cases are bulky and difficult for the user to employ.

SUMMARY OF THE INVENTION

A flat contact lens case having a liquid retaining compartment with a spring mounted platform within the compartment, said platform having covered cups for the individual lenses wherein the platform lowers into the liquid as the case is closed and rises out of the liquid when the case is opened.

DESCRIPTION OF THE PREFERRED EMBODIMENTS

Figure 1:
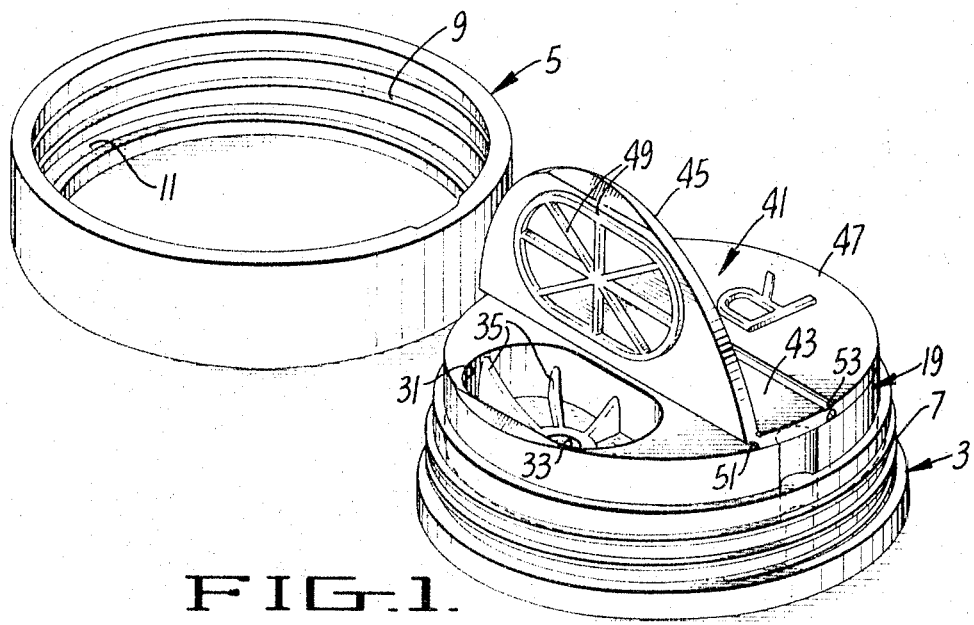
FIGURE 1 is a perspective view of the lens case, including the cover, showing the case in the open position.

The case of the present invention includes a bottom portion 3 and a top portion 5, the two portions having mating threads 7 and 9, respectively so that they can be screwed together. The cover preferably contains a sealing ring 11 so that when the two portions are screwed together, a water tight seal is provided. The bottom portion 7 is hollow in the center as at 13 so that a liquid can be contained therein. The bottom portion has a central pillar 15 having a central opening 17 therein. A platform member 19 is provided which serves as the actual container for the lenses, as is hereinafter described in detail, the platform 19 having a central hole 21 which forms a sliding fit over the pillar 15. Platform 19 has a notch 20 while the bottom 7 has a mating rib 22, preventing the parts from turning relative to each other. The upper portion of the hole is enlarged as at 23, so that the head 25 of pin 27 can pass therethrough. As can best be seen in FIGURES 2 and 3, a shoulder 22 is formed at the junction openings 21 and 23 which shoulder engages the head 25 of pin 27. The platform 19 has a pair of lens receiving cups 29 and 31, each of which is provided with an open bottom as at 33, so that a solution can pass freely in and out of the cups, yet a contact lens will not pass through the opening 33 and will be retained within the cup. Preferably the lens cups are provided with a plurality of ribs 35 so that the lenses will not stick in the cups and can be easily removed therefrom. Platform 19 also is provided with a pair of slots 37 and 39 for anchoring the cover thereon.

Figure 6:
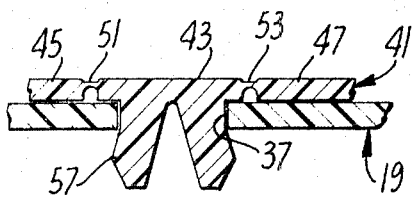
FIGURE 6 is an enlarged section on the line 6—6 of FIGURE 4 showing the cover in platform.
Figure 5:
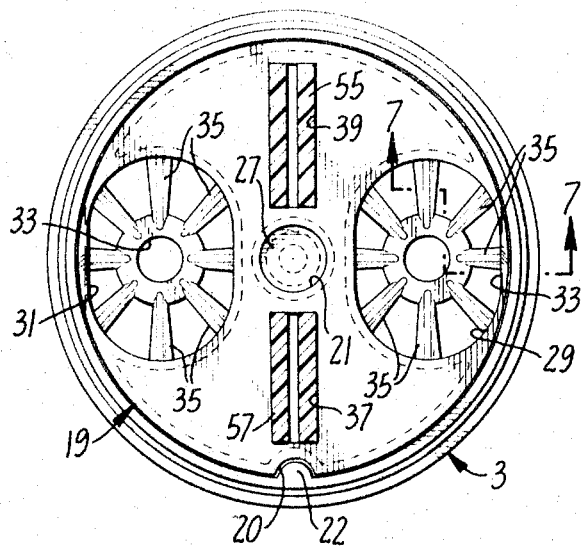
FIGURE 5 is a top plan view of the platform.
Figure 7:
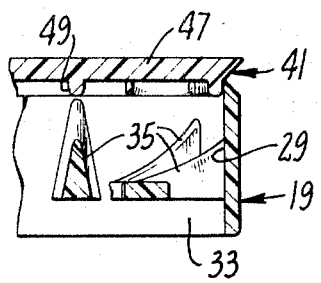
FIGURE 7, an enlarged section on the line 7—7 of FIGURE 5.

The cover is generally designated 41 and consists of a central portion 43 with side members 45 and 47 which serve as the actual individual cup covers. Preferably the cup covers are also provided with ridges or ribs 49 to prevent a lens from sticking to the cover. The cover members 45 and 47 are connected to the center 43 by means of "living" hinges 51 and 53. These are formed merely by weakening the plastic as shown, the polyolefin plastic having sufficient flexibility to bend along the weakened line. The cover is also provided with a pair of wedged-like locking members 55 and 57 which extend downwardly from the bottom surface of the cover and which engage in the slots 37 and 39 of platform 19 as is best seen in FIGURE 6.

In order to assemble the device, the platform 19 is lowered over spring 59 so that it slides on pillar 15 and the pin 27 is then passed through the opening 23 and into the opening 17. Pin 27 can be cemented in place or it can be a mere friction fit. The locking members 55 and 57 of cover 41 are then pressed into the slots 37 and 39 whereupon the cover locks in place. It is apparent that the platform with the assembled cover will now float up and down over pillar 15 as is best seen in FIGURES 2 and 3, but will be retained by pin 27.

Figure 2:
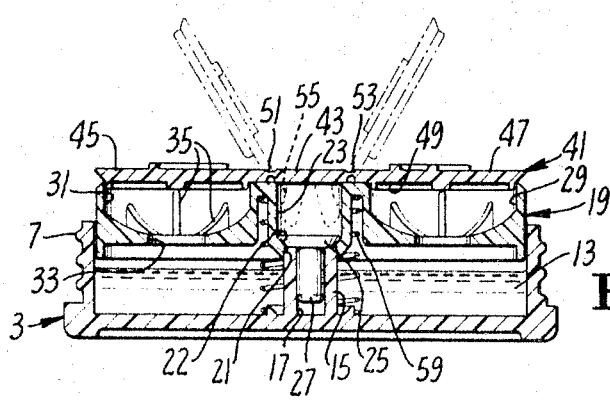
FIGURE 2 is a section through the center of the case showing the platform in the raised position.
Figure 3:
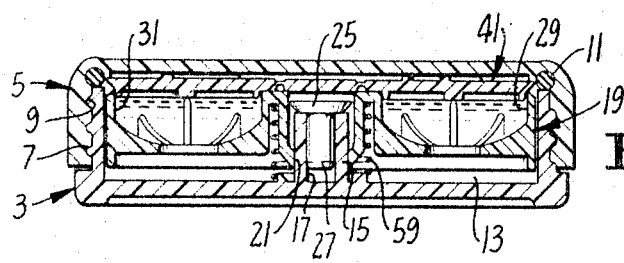
FIGURE 3 is a sectional view, similar to FIGURE 2, but showing the case closed with the platform lowered into the liquid.
Figure 4:
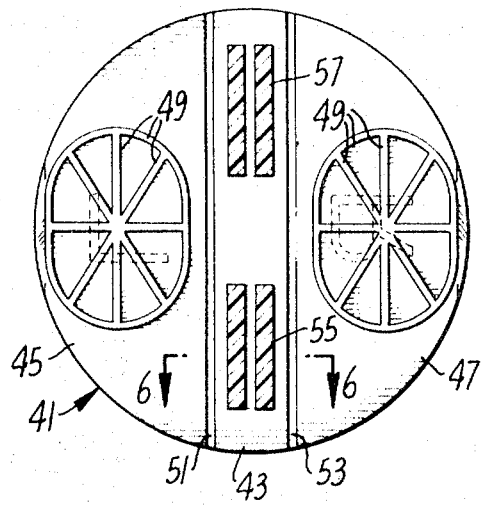
FIGURE 4 is a bottom plan view of the cover.

In FIGURE 2, the device is shown with the top off and in this position the spring 59 has extended the platform upwardly out of the solution contained in the base. In this position one or both of lids 47 and 49 can be raised and contact lenses deposited in the respective pockets 29 and 31. The covers can then be lowered and the top 5 screwed on. As can be seen in FIGURE 3, this holds the cover shut and also serves to push the platform down so that the lenses are now immersed in the solution. Obviously when the cover is removed, the spring will again raise the platform so that the lenses will be raised out of the solution and be readily accessible to the user.

Figure 8:
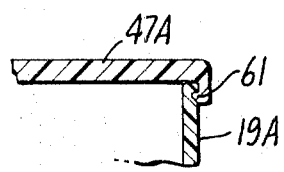
FIGURE 8 is a partial section showing an alternate method of providing a cover for the lens cups.
Figure 9:
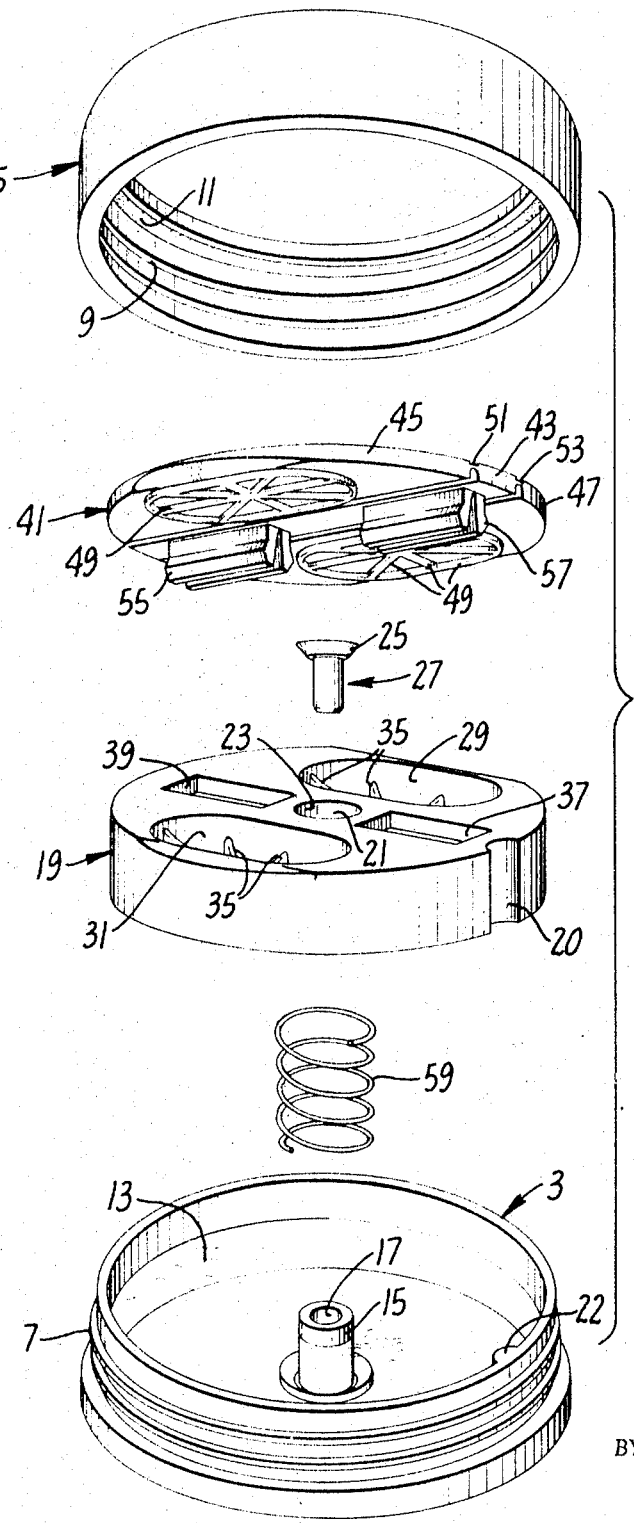
FIGURE 9 is an exploded view of the lens case of the present invention.

It is ordinarily unnecessary to provide any means for holding the covers down since when the lid is screwed on, this purpose is accomplished. However, under some circumstances, it may be desirable to provide a notched arrangement such as that shown in FIGURE 8 so that the individual covers can be snapped in place and will not be dependent upon the lid to hold them closed. Thus, a cover 47A is provided with an inturned lip 61 while the platform 19A is provided with a corresponding notch so that as the cover is lowered over the lens cup it will snap into place and be retained even should the top of the case be taken off.

All plastic parts of the case are preferably made of a soft heat sterilizable plastic such as a polyolefin, but other materials may be employed. The case is leakproof even under extreme conditions such as in an airplane. The case is thin and easy to carry; one practical embodiment is less than ½ inch thick.

It is obvious that many variations can be made in the exact structure shown without departing from the spirit of this invention.

I claim:
1. A contact lens case comprising in combination:
   (a) a base member adapted to retain a liquid,
   (b) a platform member slideably mounted within said base member,
   (c) a spring member tending to hold said platform in an elevated position,
   (d) said platform member having a pair of cups therein each to retain a contact lens,
   (e) individual hinge mounted covers overlying each of said cups to retain lenses in said cups,
   (f) a cap member adapted to close said base member, said cap member serving to push the platform member downwardly into a solution contained within the base member.

References Cited

UNITED STATES PATENTS

| | | | |
|---|---|---|---|
| 2,095,557 | 10/1937 | Neff | 134—156 XR |
| 2,568,838 | 9/1951 | Wilcox | 134—156 XR |
| 2,609,828 | 9/1952 | Ward | 134—166 XR |
| 2,967,607 | 1/1961 | Hollinger | 206—5 |
| 3,044,089 | 7/1962 | Boynton | 134—156 XR |
| 3,139,097 | 6/1964 | Hungerford et al. | 134—197 XR |
| 3,343,657 | 9/1967 | Speshyock | 206—5 |
| 3,378,020 | 4/1968 | Grabiel | 134—156 |

FOREIGN PATENTS 156,679  11/1904  Germany.

ROBERT L. BLEUTGE, Primary Examiner

U.S. Cl. X.R.

134—143, 156; 206—5